US012214533B2

(12) United States Patent
Spuller

(10) Patent No.: US 12,214,533 B2
(45) Date of Patent: Feb. 4, 2025

(54) INJECTION MOLD WITH A SIDE GATE NOZZLE

(71) Applicant: OTTO MÄNNER GMBH, Bahlingen (DE)

(72) Inventor: Swen Spuller, Forchheim (DE)

(73) Assignee: OTTO MÄNNER GMBH, Bahlingen (DE)

(*) Notice: Subject to any disclaimer, the term of this patent is extended or adjusted under 35 U.S.C. 154(b) by 0 days.

(21) Appl. No.: 17/769,243

(22) PCT Filed: Oct. 16, 2020

(86) PCT No.: PCT/EP2020/079265
§ 371 (c)(1),
(2) Date: Apr. 14, 2022

(87) PCT Pub. No.: WO2021/074415
PCT Pub. Date: Apr. 22, 2021

(65) Prior Publication Data
US 2024/0123665 A1 Apr. 18, 2024

(30) Foreign Application Priority Data
Oct. 16, 2019 (DE) .................. 10 2019 127 972.0

(51) Int. Cl.
*B29C 45/74* (2006.01)
*B29C 45/17* (2006.01)
(Continued)

(52) U.S. Cl.
CPC .............. *B29C 45/74* (2013.01); *B29C 45/20* (2013.01); *B29C 45/2606* (2013.01);
(Continued)

(58) Field of Classification Search
CPC ............ B29C 45/74; B29C 2045/2753; B29C 2045/2754; B29C 2045/2798
See application file for complete search history.

(56) References Cited

U.S. PATENT DOCUMENTS 5,122,050 A * 6/1992 Gellert .................... B29C 45/30
425/549
5,952,016 A 9/1999 Gellert
(Continued)

FOREIGN PATENT DOCUMENTS

CA 2149385 A1 11/1996
CA 2332061 A1 7/2002
(Continued)

OTHER PUBLICATIONS

German Office Action for German Application No. 102019127972.0; Report Mail Date Feb. 6, 2024 (9 Pages with machine translation).
(Continued)

*Primary Examiner* — Nahida Sultana
*Assistant Examiner* — Virak Nguon
(74) *Attorney, Agent, or Firm* — CANTOR COLBURN LLP

(57) ABSTRACT

An injection mold includes a mold insert frame having several openings extending in an axial direction (z). Each opening accommodates a mold insert encompassing a cavity, suitable to receive during operation melted plastic to form a plastic part. The several openings with the mold inserts are distributed around a center opening of the mold insert frame. A nozzle head is arranged in the center opening of the mold insert frame. A primary melt channel, extending in the axial direction (z), and per cavity a secondary melt channel are each interconnected at a dorsal end to the primary melt channel and at a distal end to a cavity by a nozzle tip attached to the nozzle head. Each mold insert
(Continued)

includes a first cooling channel surrounding the cavity and being in fluid communication with a first cooling circuit across the mold insert frame.

26 Claims, 6 Drawing Sheets

(51) Int. Cl.
  *B29C 45/20* (2006.01)
  *B29C 45/26* (2006.01)
  *B29C 45/73* (2006.01)
(52) U.S. Cl.
  CPC ............ *B29C 45/261* (2013.01); *B29C 45/73* (2013.01); *B29C 2045/1786* (2013.01)

(56) References Cited

U.S. PATENT DOCUMENTS

| | | |
|---|---|---|
| 7,645,132 B2 | 1/2010 | McCready |
| 7,845,936 B2 | 12/2010 | Babin |
| 2005/0067510 A1 | 3/2005 | Schreck |
| 2005/0196486 A1 | 9/2005 | Babin et al. |
| 2008/0279978 A1 | 11/2008 | Babin et al. |
| 2010/0183762 A1* | 7/2010 | Babin ................ B29C 45/27 425/569 |
| 2015/0197049 A1* | 7/2015 | Olaru ............... B29C 45/2735 277/300 |
| 2015/0375436 A1* | 12/2015 | Spuller ............... B29C 45/74 425/549 |
| 2017/0182691 A1* | 6/2017 | Spuller ............... B29C 45/74 |

FOREIGN PATENT DOCUMENTS

| | | |
|---|---|---|
| CA | 2482723 A1 | 3/2005 |
| CN | 105500631 B | 1/2021 |
| DE | 102009048368 A1 | 4/2011 |
| EP | 0 743 158 A1 | 11/1996 |
| JP | 2004042501 A | 2/2004 |
| WO | 2015107178 A1 | 7/2015 |

OTHER PUBLICATIONS

EPO (Riswijk, NL), English language version of the International Search Report, Form PCT/ISA/210, for International Application PCT/EP2020/079265, Jan. 22, 2021 (3 pages).

Chinese Office Action for Chinese Application No. 202080073065.2; Report Mail Date Feb. 21, 2024 (26 Pages—with English Translation).

* cited by examiner

INJECTION MOLD WITH A SIDE GATE NOZZLE

CROSS REFERENCE TO RELATED APPLICATION

This application is a National Phase filing in the United States, under 35 USC § 371, of PCT International Patent Application PCT/EP2020/079265, filed on 16 Oct. 2020 which claims the priority of German Patent Application DE 10 2019 127 972.0, filed 16 Oct. 2019.

These applications are hereby incorporated by reference herein in their entirety and is made a part hereof, including but not limited to those portions which specifically appear hereinafter.

BACKGROUND OF THE INVENTION

Field of the Invention

The present disclosure is generally directed towards the field of injection molds for injection molding of plastics and other thermoplastic materials. More particularly it is directed towards a mold comprising a side gate nozzle and a side gate nozzle.

Discussion of Related Art

From the prior art, side gate nozzles comprising a nozzle head and several nozzle tips are known. The nozzle tips in a side gate nozzle are usually arranged at the nozzle head pointing sideways with respect to the general direction of the side gate nozzle. Surrounding the nozzle head cavity halves are arranged, which form cavities when two mold halves of the injection mold are in a closed position and said cavity halves are in fluid communication with a designated nozzle tip. While the nozzle head and the thereto interconnected nozzle tips are kept on a temperature above the melting temperature of the plastic material, the mold halves in which the cavity halves are arranged are kept on a temperature significantly below the melting temperature of the plastic material. This way the plastic material injected into the cavities is cured immediately when in contact with a cavity wall to form the plastic part efficiently. The overall construction of the injection mold is to be done in a way that allows for a precise temperature control of the molten plastic material flowing through the nozzle head and the individual nozzle tips, while also providing an efficient cooling of the individual cavity halves, to allow for a short cycle time and a high quality of the produced plastic parts.

Several attempts are known from the prior art, briefly described hereinafter, which addressed the problem described above.

CA 2149385 A1 first published in November 1996 in the name of Mold-Masters Ltd relates to an injection molding apparatus for side gating to several cavities spaced around a central heated nozzle extending through an opening in the mold. Several side gate seals are seated in a front portion of the nozzle, each in alignment between one of several radial portions of a melt channel through the nozzle and a gate leading to one of the cavities. The side gate seals each have an outer end which extends a sufficient distance outwardly past the inner surface of the opening in the mold to provide room for cooling conduits extending between the cavities and the central opening. The side gate seals are mounted after the nozzle is sealed in the opening in the mold.

CA 2332061 A1 first published in July 2002 in the name of Mold-Masters Ltd relates to a nozzle end provided for removable mounting to a nozzle body for use in multiple-tipped molding applications such as edge-gated systems. The nozzle end is made of a highly thermally conductive material and is preferably inserted at least partially inside the forward end of a heated nozzle body. Removable nozzle tips are insertable in the front end of the nozzle end.

SUMMARY OF THE INVENTION

In a preferred variation, the injection mold comprises a mold insert frame forming part of a first mold half and having several openings extending in an axial direction. The mold insert frame accommodates in each opening a mold insert encompassing a (first) cavity half, suitable to receive during operation in combination with a corresponding (second) cavity half, forming part of a second mold half, melted plastic to form a plastic part therein. Preferably the several openings with the mold inserts are distributed around a center opening of the mold insert frame.

Usually, a nozzle head is arranged in the center opening of the mold insert frame. The nozzle head comprises a primary melt channel, extending in the axial direction. Per cavity a secondary melt channel interconnects at a dorsal end to the primary melt channel and at a distal end to a cavity by a nozzle tip attached to the nozzle head.

Efficient cooling can be achieved by two independent cooling channels as described hereinafter in more detail. A first cooling channel surrounds the cavity and is in fluid communication with a first cooling circuit across the mold insert frame. Preferably, second cooling channel is in fluid communication with a second cooling circuit across the mold insert frame. Good results can be achieved, when the first cooling channel encompasses the cavity distal from the nozzle tip and the second cooling channel encompasses the cavity adjacent to the nozzle tip. Depending on the results to be achieved at least the outlet(s) and/or inlet(s) of the cooling circuits can be combined. While the first cooling channel is preferably helix shaped, the second cooling channel has, when seen in the axial direction a "C"-shaped cross-section following the contour of the cavity half in the mold insert adjacent to the nozzle tip.

A simple design is possible, when at least one cooling channel is arranged between an inner wall of the opening and a thereto corresponding outer wall of the mold insert. The mold insert frame may comprise a cylindrical outer side wall in which a first supply channel extends in circumferential direction. Furthermore, a second supply channel may extend in the cylindrical outer side wall in a circumferential direction. However differently shaped mold insert frames are possible having an outer side wall comprising at least one planar outer side wall segment. These mold insert frames may have a rectangular cross-section. In particular, cuboid shaped mold insert frames are possible. Furthermore, in some variations the first supply channel and/or the second supply channel may be formed as a bore connecting the outside of the mold insert frame and at least one cooling channel. Depending on the design the first and the second supply channel can be in fluid communication with each other. If appropriate the first supply channel forms part of the first cooling circuit, while the second supply channel may form part of the second cooling circuit.

In a preferred variation, the mold insert frame may comprise a lower part and an upper part separated at a bottom face. At least one electrical connector can be arranged in said bottom face, respectively the projection thereof. By this design the cooling circuits and the electrical connections can be spatially separated from each other in an efficient manner, preventing interference, e.g., during maintenance. The at least one electrical connector is preferably arranged displaceable in a direction perpendicular to the bottom face of the mold insert frame. Good results can be achieved, when the position of the electrical connector, with respect to the bottom face, can be adjusted by a set screw from the outside. The at least one electrical connector can be arranged in a recess of the mold insert frame adjacent to the bottom face. Thereby it is arranged in a space saving manner and protected from outside influence. This in addition allows during assembly to connect the electrical connector after the preassembled insert frame was inserted into a first mold half of the injection mold by means of the set screw. Connecting the electrical connector as one of the last steps increases the safety during assembly.

In a variation, the mold insert frame may be configured to allow the electrical connection to be made on a lateral side of the mold insert frame for a compact construction. This can be achieved in that the mold insert frame comprises a cable channel extending between the center opening and the outside of the mold insert frame for routing of cables therein. Preferably the cable channel is formed as a recess in the bottom face of the mold insert frame allowing an easy routing of cabled. Additionally, a cable channel cover may be attached to the bottom face of the mold insert frame to at least partially cover the recess-like cable channel.

Good results can be achieved, when the nozzle head is in at least one direction thermally separated with respect to a top face by a spacer which simultaneously acts as supporting element for the nozzle head in at least one direction, especially during injection of melted plastic material that supports the nozzle head against the reactions forces resulting from the injection pressure in the axial direction. The spacer is preferably arranged concentric with respect to general direction of the primary melt channel in the nozzle head. To achieve a minimal thermal coupling between the mold insert frame and the top face, the support element consists preferably of a material with low thermal conductivity like a ceramic material, however other materials are thinkable.

In a preferred variation, the secondary melt channels extend from the primary melt channel star-like in a radial direction. They are preferably arranged rotationally symmetric with respect to the center axis, respectively the primary melt channel. For balanced operation, all secondary melt channels preferably are having the same length. For best results, two neighboring secondary melt channels are preferably thermally separated from each other by a gap extending in axial direction. Similar to the secondary melt channels, the gaps are preferably arranged star-like in a radial direction. Alternatively, or in addition, the primary melt channels can be at least partially thermally separated from the secondary melt channels by a circumferential gap arranged circumferential to the primary melt channel. The several gaps in radial direction extend into the circumferential gap. Thereby the circumferential gap in combination with the several gaps in the radial direction form segments of the nozzle head with reduced thermal coupling between neighboring segments.

Depending on the design, at least one heating element can be arranged adjacent to a secondary melt channel. Preferably, the at least one heating element is arranged in a bore in the nozzle head. If appropriate, at least one sensor element is arranged adjacent to a secondary melt channel. Preferably, the at least one sensor element is arranged in a bore in the nozzle head. The heating element and the sensor element can be arranged in the same bore in a space saving manner. The sensor element may be integrated into the heating element far an even more compact design.

For best performance, adjacent to each secondary melt channel a thereto associated heating element and an associated sensor element can be arranged, which in circumferential direction are separated from each other by at least one gap. This provides a minimal thermal coupling between two neighboring secondary melt channels and allows a temperature control of each individual secondary melt channel.

In a variation, the injection mold comprises a core forming part of a second mold half. The cavity can at least partially be formed in a closed position of the injection mold with the thereto in the axial direction displaceable core forming the second cavity half. Usually, the second mold half comprises the same number of cores as the first mold half comprises mold inserts.

In case of the production of tubular plastic parts, the contact region of the core and first mold half is subjected to wear, as a mechanical contact of the core and the first mold half, in particular, with the mold insert, is made each cycle in the closed position of the injection mold in order to form a tubular cavity. A good resilience to wear can be achieved, when a centering bushing comprising a centering recess is arranged opposite of the core in the axial direction and adjacent to the mold insert. The centering bushing can be arranged, such that a core tip of the core is in the closed position at least partially accommodated in the centering recess. This way the mechanical contact in the closed position is made between the centering recess and the core keeping away wear from the mold insert. In a preferred variation the centering bushing is held by a bushing support in a floating manner and is aligned by an alignment surface of the mold insert in contact with the centering bushing, such that the centering recess is coaxial with the core in the closed position. Alternatively, or in addition the alignment surface can be provided by the bushing support in contact with the centering bushing, such that the centering recess is essentially coaxial with the core in the closed position. The bushing support usually holds the centering bushing in a floating manner in a plane perpendicular to the axial direction. The bushing support may further be integrally formed or of a multi-part design. The alignment surface is preferably conical in order to achieve the coaxial alignment of the core and the centering recess, however cylindrical alignment surfaces are possible as well. The centering bushing can at least partially be made from an elastic material. This has the advantage that a certain misalignment during production between the core and the centering recess due to thermal expansion can be compensated. An alignment of the centering recess can be initiated when moving the bushing support in the axial direction towards the mold insert. Thereby the conical alignment surface aligns the cantering bushing. The bushing support may be displaced by means of a piston arranged displaceable in the axial direction adjacent to the bushing support.

The above described construction archives, that the core tip is in the closed position not in direct contact with the mold insert, which is therefore preserved from wear caused by the core tip.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
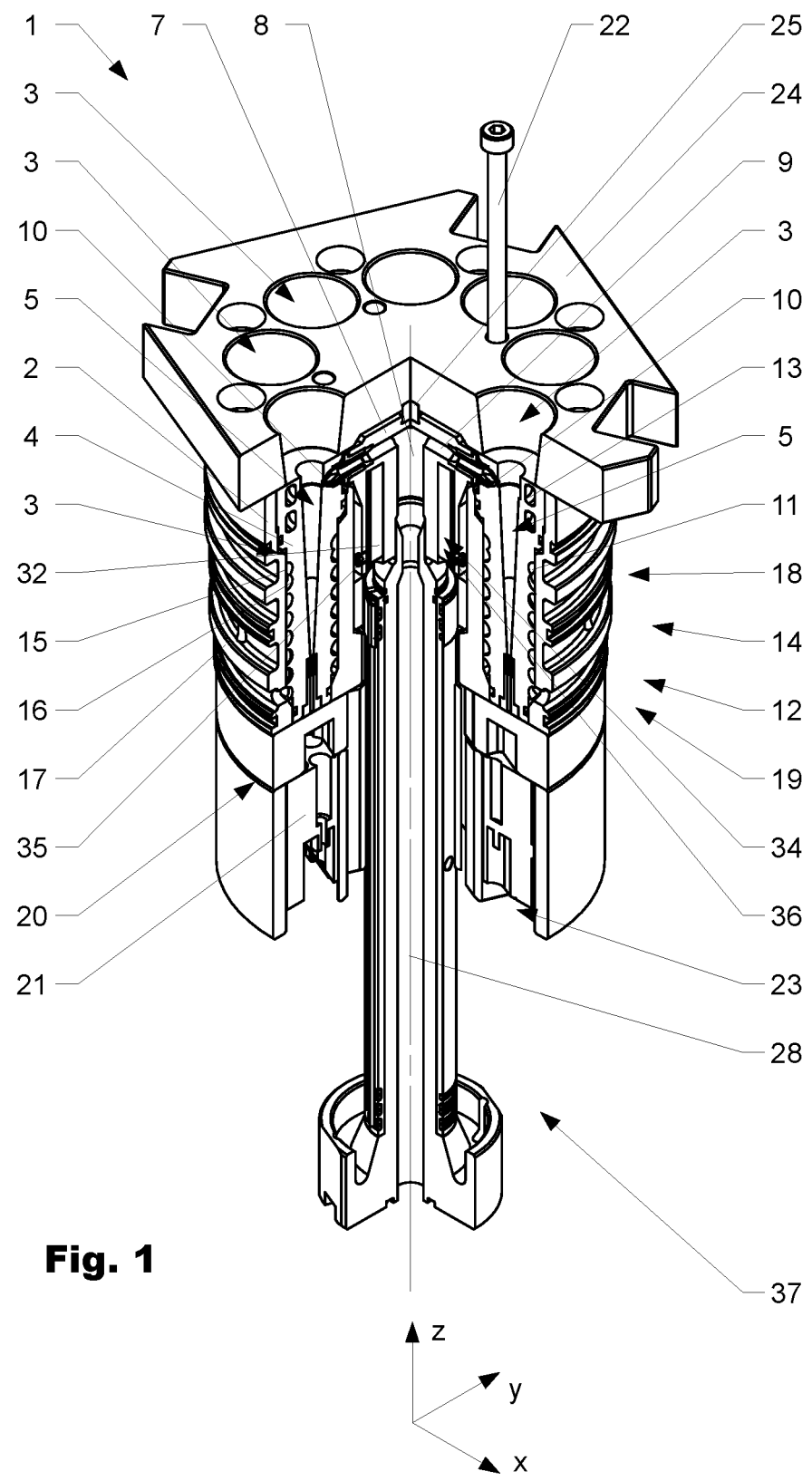
FIG. 1 shows a first variation of an injection mold in a perspective manner in a partially sectioned view.
Figure 2:
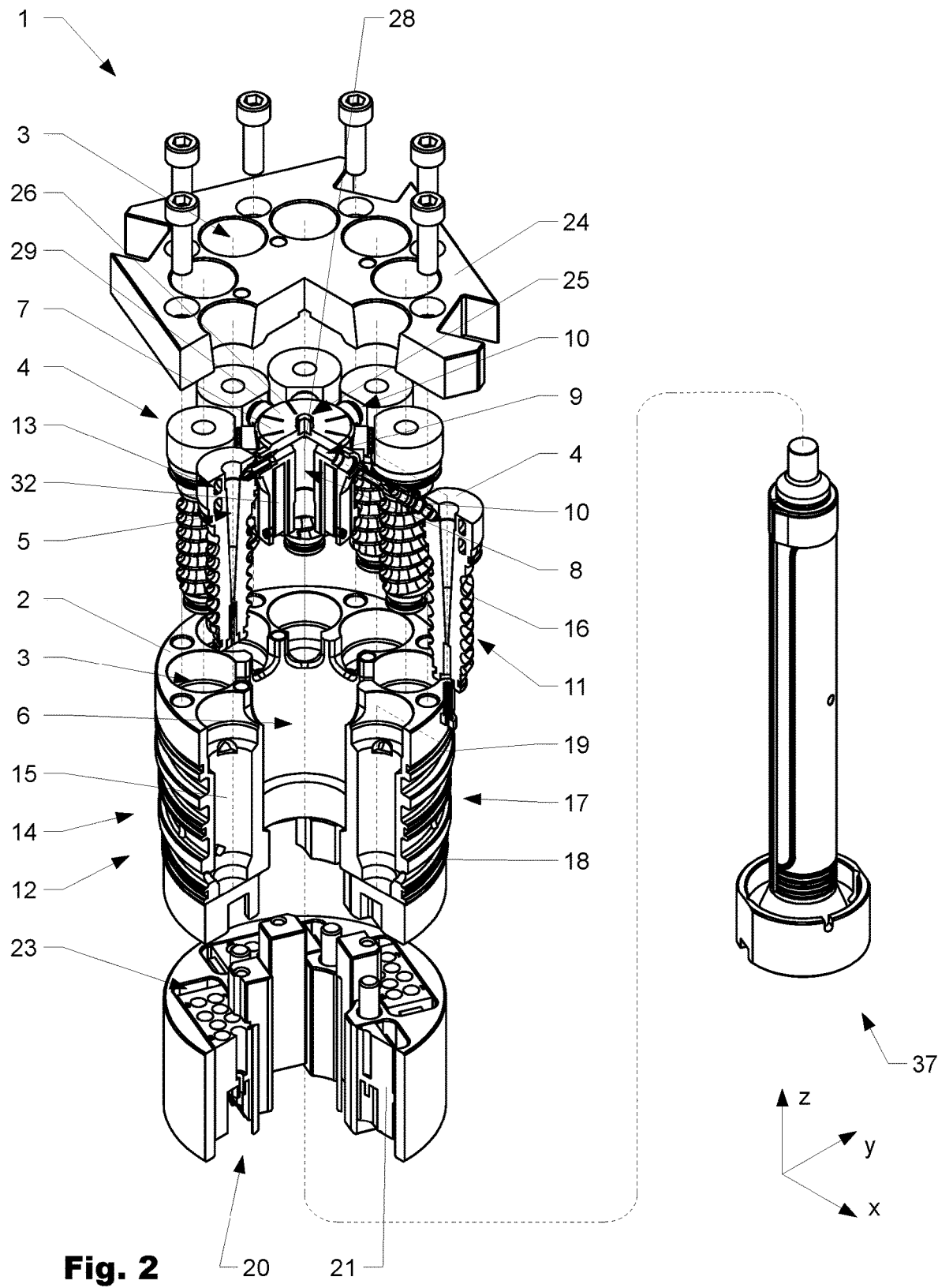
FIG. 2 shows the variation according to FIG. 1 in a perspective manner in an exploded view.
Figure 3:
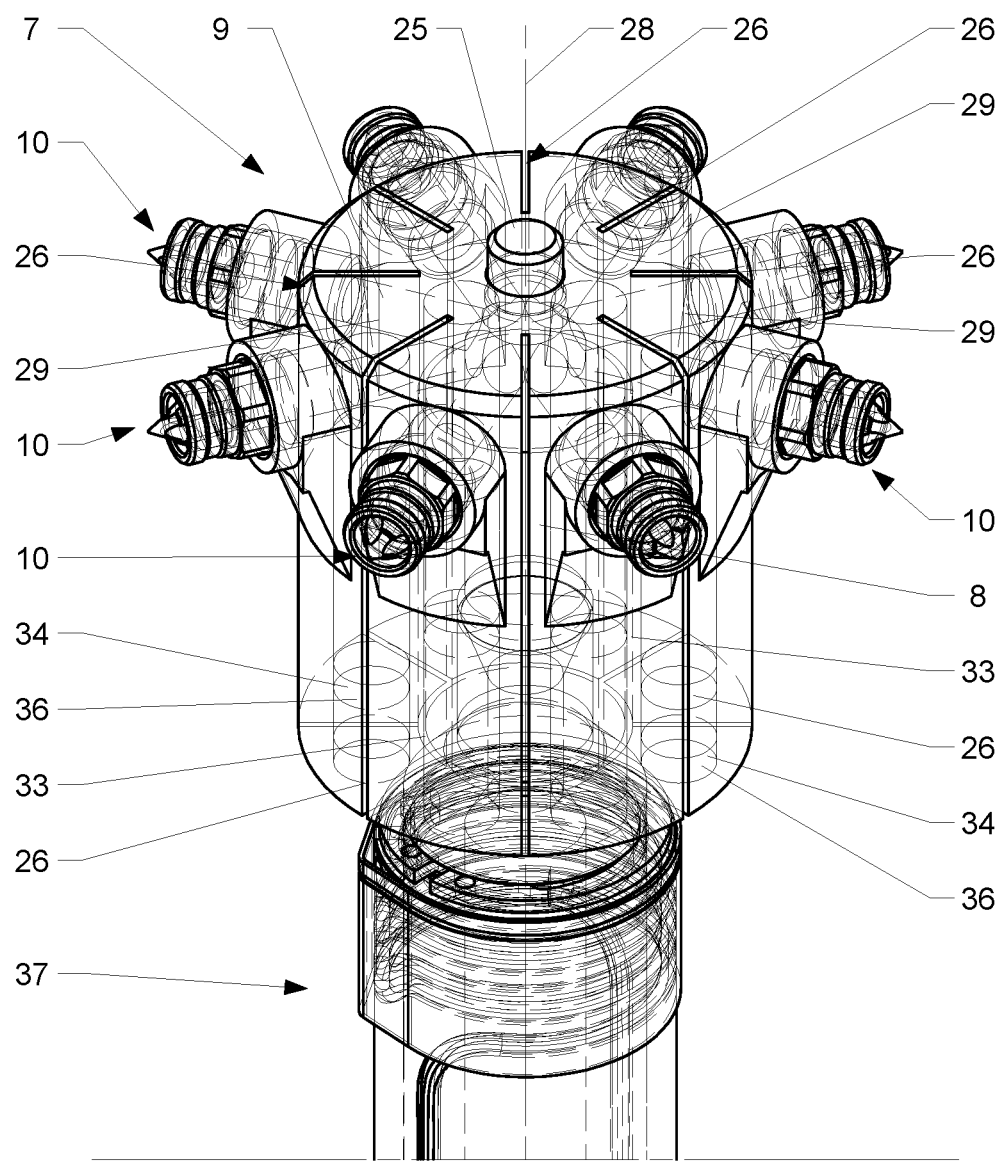
FIG. 3 shows a nozzle head according to FIG. 1 in perspective view.
Figure 4:
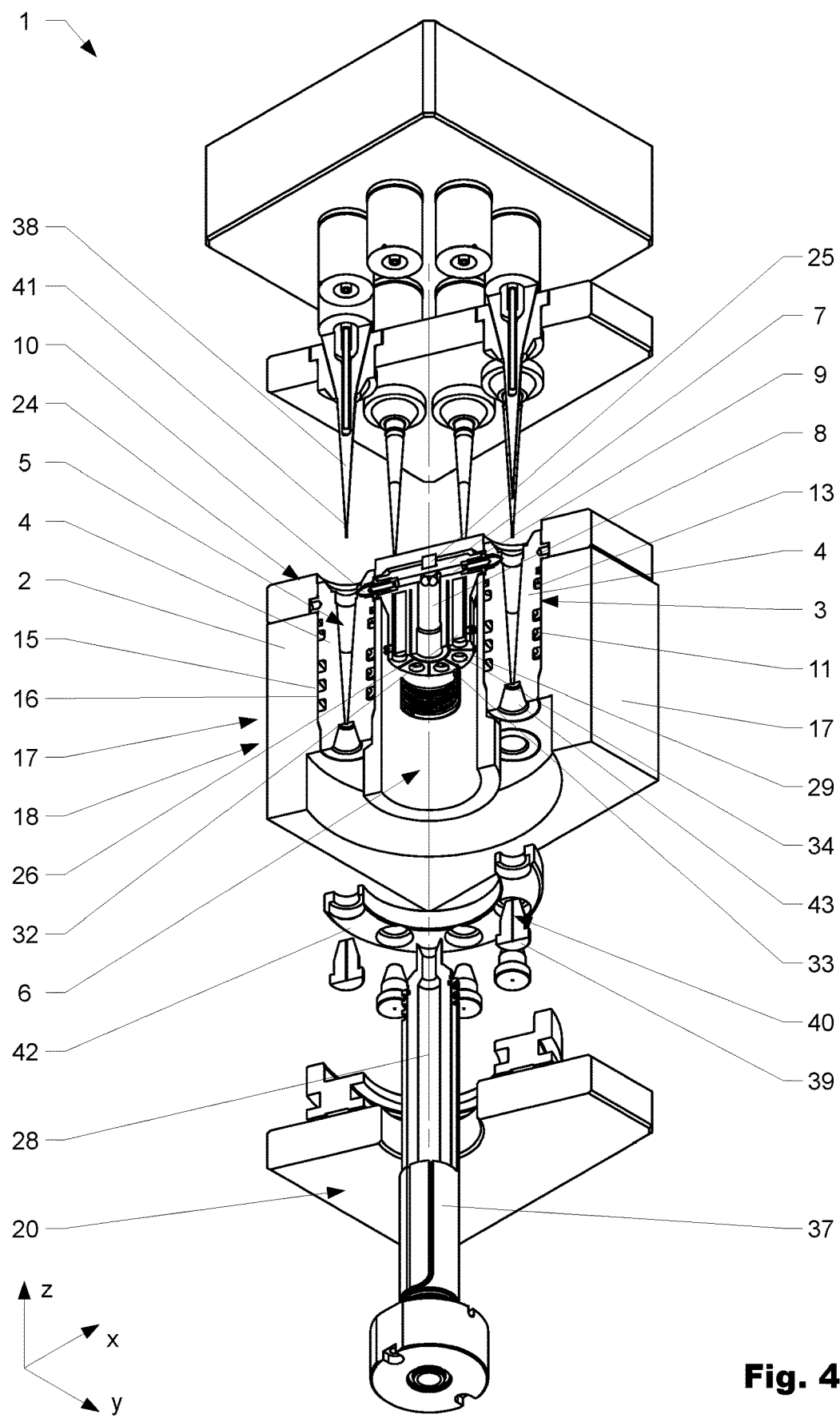
FIG. 4 shows a second variation of the injection mold in a perspective manner in an exploded view.
Figure 5:
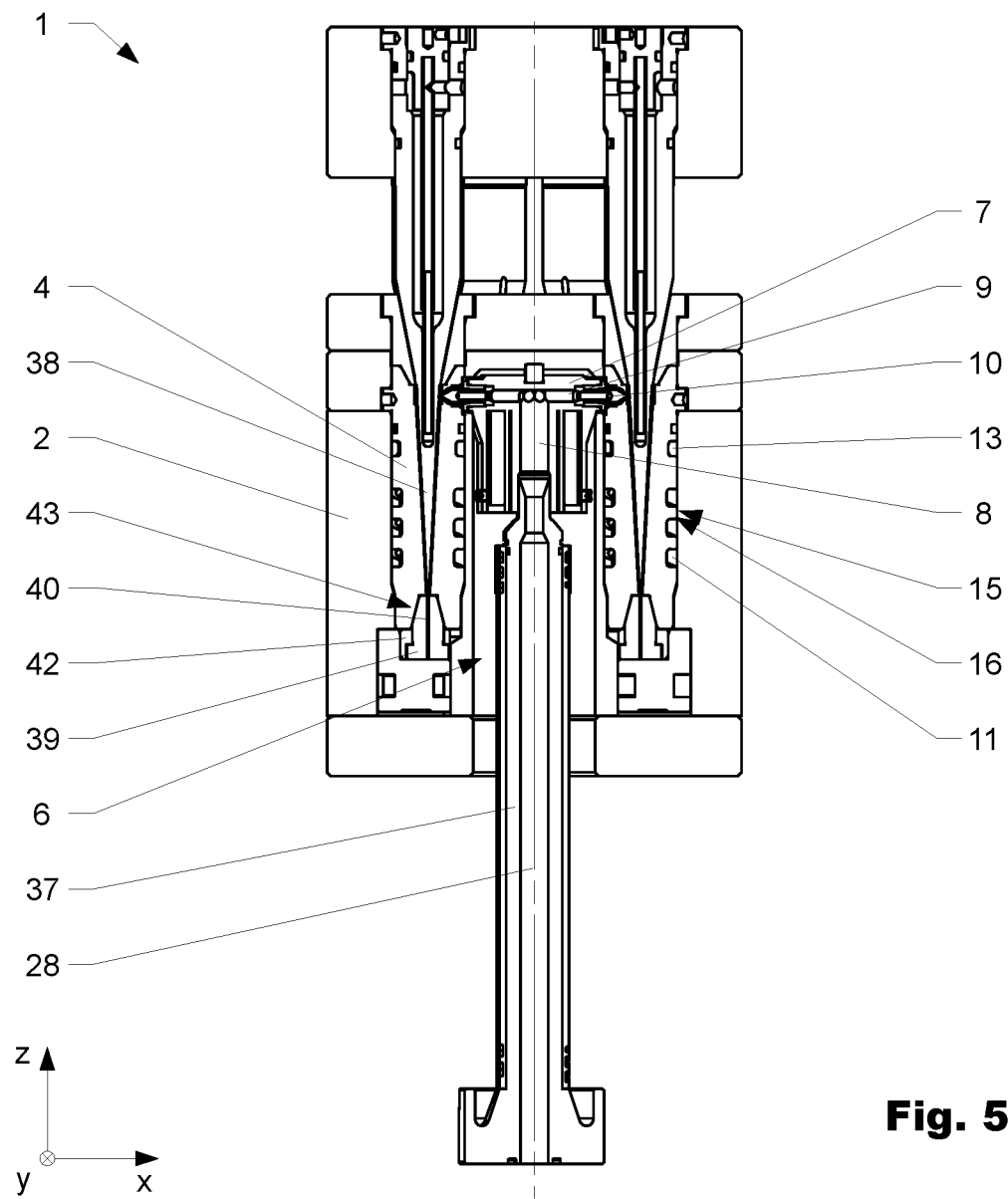
FIG. 5 shows the variation according to FIG. 4 in a sectioned view.
Figure 6:
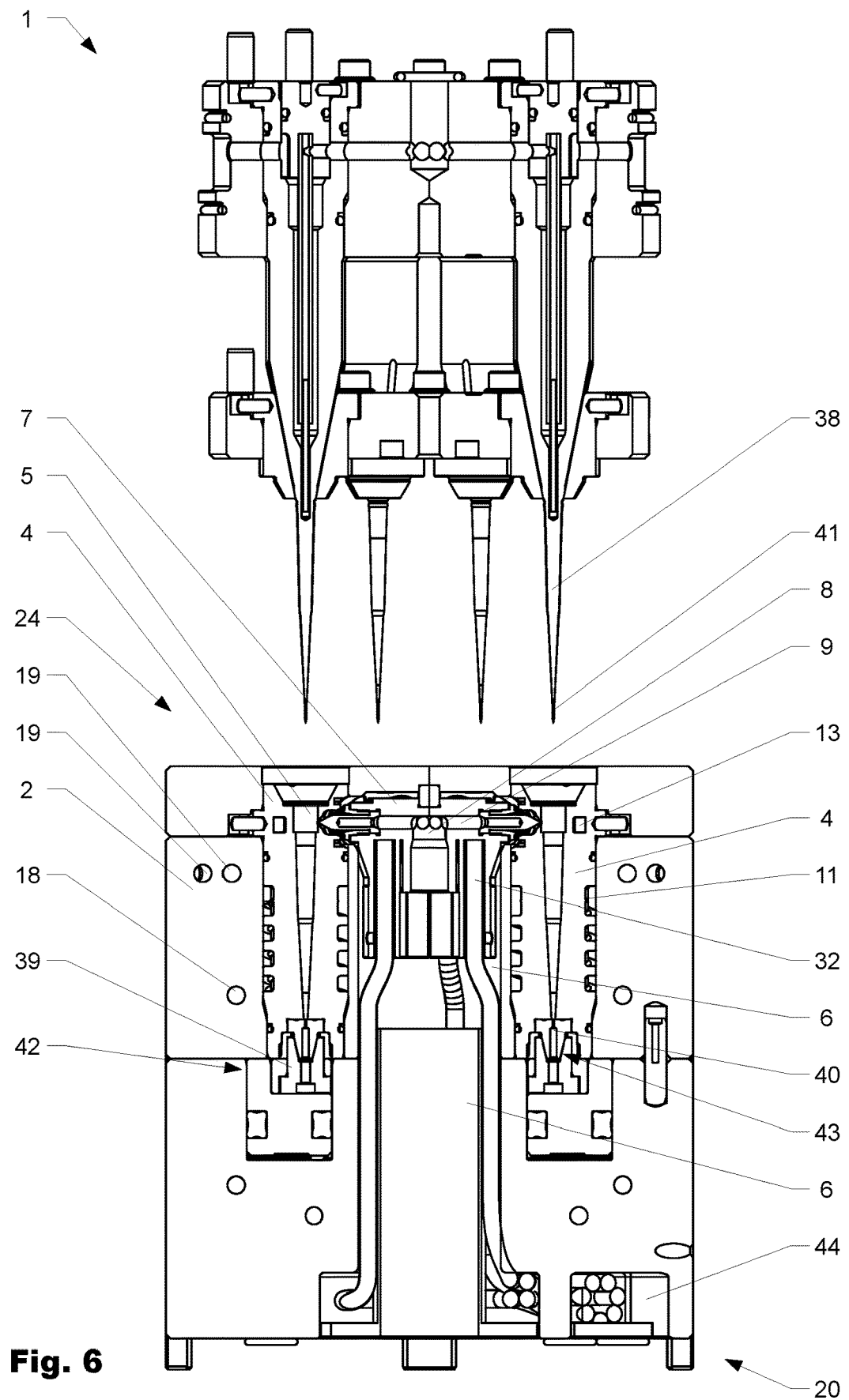
FIG. 6 shows a third variation of the injection mold in a perspective manner in an exploded view.

FIG. 1 shows relevant aspects of a first variation of an injection mold 1 in a perspective manner in a partially sectioned view. FIG. 2 shows the variation according to FIG. 1 in a perspective manner in an exploded view and FIG. 3 shows a nozzle head according to FIG. 1 with hidden edges displayed as dash lines. Not shown is the complete mold comprising the hereinafter described elements. A mold usually comprises in addition a first mold half (nozzle side) in which the elements shown hereinafter are during production incorporated. Furthermore, the injection mold 1 usually comprises a second mold half (ejector side), as shown in FIGS. 4 to 6, which interacts in a closed position with the first mold half forming at least one cavity 5 as described hereinafter in more detail. FIG. 4 shows a second variation of the injection mold 1 in a perspective manner in an exploded view of the first mold half in an open position. Whereas FIG. 5 shows the variation according to FIG. 4 in a sectioned view and in a closed position. FIG. 6 shows a third variation of the injection mold 1 in a perspective manner in an exploded view of the first mold half in an open position The injection mold 1 partially shown in FIGS. 1, 2, 4, 5 and 6 comprises a mold insert frame 2 having several openings 3 extending in an axial direction (z-direction). Each of the openings 3 accommodates a mold insert 4 encompassing a (first) cavity half 5. The (first) cavity half 5 forms in combination with a corresponding (second) cavity half in a closed position of the injection mold 1 a cavity suitable to receive during operation melted plastic to form a plastic part, as best visible in FIG. 5. The openings 3 with the mold inserts 4 are distributed around a center opening 6 of the mold insert frame 2.

A nozzle head 7 as best visible in FIG. 3 is arranged in the center opening 6 of the mold insert frame 2. The nozzle head 7 comprises a primary melt channel 8, extending in the axial direction z, or more specifically around a central axis 28. Per cavity 5 a secondary melt channel 9 interconnects at a dorsal end to the primary melt channel 8 and at a distal end to a cavity 5 by a nozzle tip 10, which is attached to the nozzle head 7.

A nozzle body 37 is during production accommodated in the center opening 6 and said nozzle body 37 is interconnected to the primary melt channel 8 of the nozzle head 7, as shown in FIG. 1.

As illustrated in FIG. 2 each mold insert 4 comprises a helix shaped first cooling channel 11, which surrounds and encompasses the cavity 5 distal from the nozzle tip 10. The first cooling channel 11 is in fluid communication with a first cooling circuit 12 across the mold insert frame 2 and its inlet and outlet openings are on essentially the same level in the axial direction. When seen in the axial direction z a "C"-shaped second cooling channel 13 encompasses the cavity 5 adjacent to the nozzle tip 10 and is in fluid communication with a second cooling circuit 14 across the mold insert frame 2. In the displayed variations of FIGS. 1, 2, 4, 5 and 6 the second cooling channel 13 comprises two "C"-shaped circulations, however different number of circulations are thinkable. In the shown variation, at least one cooling channel 11, 13 is arranged between an inner wall 15 of the opening 3 and a thereto corresponding outer wall 16 of the mold insert 4. In the case at hand the first cooling channel 11 is arranged between an inner wall 15 of the opening 3 and a thereto corresponding outer wall 16 of the mold insert 4.

In the first variation, as visible in FIGS. 1 and 2 a first and a second supply channel 18, 19 are arranged in a cylindrical outer side wall 17 of the mold insert frame 2, each extending in circumferential direction. In the second and third variation, shown in FIGS. 4, 5 and 6, the first and the second supply channel 18, 19 are passing through the outer side wall 17 of the cuboid-shaped mold insert frame 2, each extending in a direction perpendicular to the axial direction, as indicated in FIG. 6.

The exploded views of FIGS. 2 and 4 give insight into the layered construction of the mold insert frame 2 comprising a bottom face 20 in which at least one electrical connector 21 is arranged and a top face 24. In the third variation of the injection mold 1, as shown in FIG. 6 the mold insert frame 2 comprises a cable channel 44 connecting the center opening 6 and rectangular the outer side wall 17 of the mold insert frame 2 for an electrical connection made from a lateral side of the mold insert frame 2. This allows a more compact construction of the injection mold 1 in the axial direction z compared to the first and second variation. In the shown third variation the electrical cables supplying the heating elements 32 run through the cable channel 44 and in addition the cable for the sensor elements 35 is also routed through said cable channel 44.

Between the top face 24 and the bottom face 20 in the axial direction z the mold insert frame 2 and the nozzle head 7 are arranged in the assembled state as shown in FIGS. 1, 5 and 6.

The at least one electrical connector 21 is arranged displaceable perpendicular to the bottom face 20 and the position of the electrical connector 21 with respect to the bottom face 20 can be adjusted by a set screw 22 from the outside as best visible in FIG. 1. A recess 23 of the mold insert frame 2 adjacent to the bottom face 20 accommodates the electrical connector 21.

The nozzle head 7 is in at least the axial direction thermally separated with respect to a top face 24 by a spacer 25 and the spacer 25 is arranged concentric with respect to the primary melt channel 8. To achieve a thermal decoupling of the top face 24 from the nozzle head 7 the connecting spacer 25 consists of a material with low thermal conductivity, in this case a ceramic.

FIG. 3 allows insight into the inner structure of the nozzle head 7 as hidden edges are displayed. It can be seen that the secondary melt channels 9 extend star-like from the primary melt channel 8 in a radial direction. Further, two neighboring secondary melt channels 9 are in circumferential direction thermally separated from each other by a gap 26 extending in axial direction z across the nozzle head 7 thereby forming segments 29. In the variation shown several slit-like gaps 26 are arranged star-like around the primary melt channel 8 and form a rotationally symmetric pattern. In addition, the primary melt channel 8 is partially thermally separated from the secondary melt channels 9 by a circumferential gap 33 arranged circumferential to the primary melt channel 8. In the embodiment displayed in FIG. 3 the gaps 26 extend in radial direction into the circumferential gap 33 forming segments 29 of the nozzle head 7.

As shown in FIGS. 1 and 2, and best visible in FIG. 6, heating elements 32 are arranged adjacent to each secondary melt channel 9 each in a respective bore 34 in the nozzle head 7. In addition, one sensor element 35 is arranged adjacent to each secondary melt channel 9 a respective bore 36 in the nozzle head 7. More particularly the heating elements 32 and the sensor elements 35 are arranged together in the same bore 34, 36. In other words, adjacent to each secondary melt channel 9 a thereto associated heating element 32 and an associated sensor element 35 are arranged, which in circumferential direction are separated from each other by at least one gap 26.

The injection mold 1, as illustrated in FIGS. 4, 5 and 6, comprises a core 38 per mold insert 4 forming part of a second mold half of the injection mold 1. The cavity 5 is essentially formed in a closed position of the injection mold 1 between the in the axial direction z displaceable core 38 and the associated mold insert 4. Here the second mold half comprises the same number of cores 38 as the first mold half comprises mold inserts 4.

In case of the production of tubular plastic parts (like pipettes, not shown) the contact region of the core 38 and first mold half is subjected to wear, as a contact of the core 38 and the first mold half in the contact region is made each cycle in the closed position of the injection mold 1.

In order to minimize wear and/or to make the part subject to wear easily replaceable, a centering bushing 39 comprising a centering recess 40 is arranged opposite of the core 38 and adjacent to the mold insert 4 in the axial direction z. This can be observed in the second and third variation of the injection mold 1 as shown in FIGS. 4 to 6. The centering bushing 39 is arranged, such that a core tip 41 of the core 38 is in the closed position at least partially accommodated in the centering recess 40. To allow a precise positioning of the centering bushing 39, it is held by a bushing support 42 in a floating manner and is in the second variation aligned by an alignment surface 43 of the mold insert 4 in contact with the centering bushing 39, such that the centering recess 40 is coaxial with the core 38 in the closed position of the injection mold 1.

Alternatively, as shown in the third variation the alignment surface 43 is arranged at the bushing support 42. The bushing support 42 holds the centering bushing 39 in a floating manner in a plane perpendicular to the axial direction z. The alignment surface 43 is in the second and third variation respectively, as shown in FIGS. 4 to 6, conical in order to achieve the coaxial alignment of the core 38 and the centering recess 40.

Rather, the words used in the specification are words of description rather than limitation, and it is understood that various changes may be made without departing from the Spirit and scope of the invention.

The invention claimed is:

1. An injection mold (1) comprising
   a. a mold insert frame (2) having several openings (3) extending in an axial direction (z) accommodating in each opening (3) a mold insert (4) encompassing a cavity (5), suitable to receive during operation melted plastic to form a plastic part; wherein
   b. the several openings (3) with the mold inserts (4) are distributed around a center opening (6) of the mold insert frame (2);
   c. a nozzle head (7) arranged in the center opening (6) of the mold insert frame (2) comprising a primary melt channel (8), extending in the axial direction (z), and per cavity (5) a secondary melt channel (9) each interconnected at a dorsal end to the primary melt channel (8) and at a distal end to a cavity (5) by a nozzle tip (10) attached to the nozzle head (7); wherein
   d. each mold insert (4) comprises a first cooling channel (11) surrounding the cavity (5) and being in fluid communication with a first cooling circuit (12) across the mold insert frame (2) and
   e. wherein the mold insert frame (2) comprises a cylindrical outer side wall (17) in which a first supply channel (18) extends in circumferential direction, or
   f. wherein a first supply channel (18) is formed as a bore connecting the outside of the mold insert frame (2) and the first cooling channel (11).

2. The injection mold (1) according to claim 1, wherein a second cooling channel (13) is present, wherein the first cooling channel (11) encompasses the cavity (5) distal from the nozzle tip (10) and the second cooling channel (13) encompasses the cavity (5) adjacent to the nozzle tip (10) and wherein the second cooling channel (13) is:
   a. in fluid communication with a second cooling circuit (14) across the mold insert frame (2); and/or
   b. the first and the second cooling channels (11, 13) are interconnected to the first cooling circuit (12).

3. The injection mold (1) according to claim 2, wherein the first cooling channel (11) is helix shaped and the second cooling channel (13) has, when seen in the axial direction (z) a "C"-shaped cross-section.

4. The injection mold (1) according to claim 1, wherein at least one cooling channel (11, 13) is arranged between an inner wall (15) of the opening (3) and a thereto corresponding outer wall (16) of the mold insert (4).

5. The injection mold (1) according to claim 1, wherein the mold insert frame (2) comprises a bottom face (20) in which at least one electrical connector (21) is arranged.

6. The injection mold (1) according to claim 5, wherein the at least one electrical connector (21) is arranged displaceable perpendicular to the bottom face (20).

7. The injection mold (1) according to claim 6, wherein the position of the electrical connector (21) with respect to the bottom face (20) can be adjusted by a set screw (22) from the outside.

8. The injection mold (1) according to claim 6, wherein the at least one electrical connector (21) is arranged in a recess (23) of the mold insert frame (2) adjacent to the bottom face (20).

9. The injection mold (1) according to claim 1, wherein the mold insert frame (2) comprises a cable channel (44) extending between the center opening (6) and the outside of the mold insert frame (2) for routing of cables therein.

10. The injection mold (1) according to claim 1, wherein the nozzle head (7) is in at least one direction thermally separated with respect to a top face (24) by a spacer (25).

11. The injection mold (1) according to claim 10, wherein the spacer (25) is arranged concentric with respect to the primary melt channel (8).

12. The injection mold (1) according to claim 1, wherein the secondary melt channels (9) are arranged rotationally symmetric with respect to the primary melt channel (8).

13. The injection mold (1) according to claim 12, wherein two neighboring secondary melt channels (9) are thermally separated from each other by a gap (26) extending in axial direction (z).

14. The injection mold (1) according to claim 13, wherein several gaps (26) are arranged in a radial direction around the primary channel (8) and form a rotationally symmetric pattern.

15. The injection mold (1) according to claim 14, wherein the primary melt channel (8) is at least partially thermally separated from the secondary melt channels (9) by a circumferential gap (33) arranged circumferential to the primary melt channel (8) and wherein the several gaps (26) in radial direction extend into the circumferential gap (33).

16. The injection mold (1) according to claim 1, wherein the primary melt channel (8) is at least partially thermally separated from the secondary melt channels (9) by a circumferential gap (33) arranged circumferential to the primary melt channel (8).

17. The injection mold (1) according to claim 1, wherein at least one heating element (32) is arranged adjacent to a secondary melt channel (9).

18. The injection mold (1) according to claim 17, wherein the at least one heating element (32) is arranged in a bore (34) in the nozzle head (7).

19. The injection mold (1) according to claim 18, wherein at least one sensor element (35) is arranged adjacent to a secondary melt channel (9) and wherein the heating element (32) and the sensor element (35) are arranged in the same bore (34, 36).

20. The injection mold (1) according to claim 19, wherein adjacent to each secondary melt channel (9) a thereto associated heating element (32) and an associated sensor element (35) are arranged, which in circumferential direction are separated from each other by at least one gap (26).

21. The injection mold (1) according to claim 1, wherein at least one sensor element (35) is arranged adjacent to a secondary melt channel (9).

22. The injection mold (1) according to claim 21, wherein the at least one sensor element (35) is arranged in a bore (36) in the nozzle head (7).

23. The injection mold (1) according to claim 1, wherein the cavity (5) is at least partially formed in a closed position of the injection mold (1) with a thereto in the axial direction (z) displaceable core (38).

24. The injection mold (1) according claim 23, wherein a centering bushing (39) comprising a centering recess (40) is arranged opposite of the core (38) in the axial direction (z) and adjacent to the mold insert (4), such that a core tip (41) of the core (38) is in the closed position at least partially accommodated in the centering recess (40).

25. The injection mold (1) according to claim 24, wherein the centering bushing (39) is held by a bushing support (42) in a floating manner and is aligned by an alignment surface (43) of the mold insert (4) and/or the bushing support (42) is in contact with the centering bushing (39), such that the centering recess (40) is coaxial with the core (38) in the closed position.

26. An injection mold (1) comprising
 a. a mold insert frame (2) having several openings (3) extending in an axial direction (z) accommodating in each opening (3) a mold insert (4) encompassing a cavity (5), suitable to receive during operation melted plastic to form a plastic part, wherein
 b. the several openings (3) with the mold inserts (4) are distributed around a center opening (6) of the mold insert frame (2);
 C. a nozzle head (7) arranged in the center opening (6) of the mold insert frame (2) comprising a primary melt channel (8), extending in the axial direction (z), and per cavity (5) a secondary melt channel (9) each interconnected at a dorsal end to the primary melt channel (8) and at a distal end to a cavity (5) by a nozzle tip (10) attached to the nozzle head (7), wherein
 d. each mold insert (4) comprises a first cooling channel (11) surrounding the cavity (5) and being in fluid communication with a first cooling circuit (12) across the mold insert frame (2), and
 e. a second cooling channel (13), wherein the first cooling channel (11) encompasses the cavity (5) distal from the nozzle tip (10) and the second cooling channel (13) encompasses the cavity (5) adjacent to the nozzle tip (10) and wherein the second cooling channel (13) is:
 f. in fluid communication with a second cooling circuit (14) across the mold insert frame (2) and/or
 g. the first and the second cooling channel (11, 13) are interconnected to the first cooling circuit (12).

* * * * *